United States Patent
Moss et al.

(10) Patent No.: US 10,422,716 B2
(45) Date of Patent: Sep. 24, 2019

(54) METHOD AND SYSTEM FOR LEAK TESTING

(71) Applicant: Pall Corporation, Port Washington, NY (US)

(72) Inventors: Nicholas Moss, Hampshire (GB); Robin Hodges, Hampshire (GB)

(73) Assignee: Pall Corporation, Port Washington, NY (US)

(*) Notice: Subject to any disclaimer, the term of this patent is extended or adjusted under 35 U.S.C. 154(b) by 252 days.

(21) Appl. No.: 15/372,595

(22) Filed: Dec. 8, 2016

(65) Prior Publication Data
US 2018/0164180 A1  Jun. 14, 2018

(51) Int. Cl.
*G01M 3/32* (2006.01)
*G01M 3/36* (2006.01)

(52) U.S. Cl.
CPC ............ *G01M 3/3218* (2013.01); *G01M 3/36* (2013.01)

(58) Field of Classification Search
CPC ............................. G01M 3/3218; G01M 3/36
See application file for complete search history.

(56) References Cited

U.S. PATENT DOCUMENTS

| | | | | |
|---|---|---|---|---|
| 3,683,677 A * | 8/1972 | Harris | .................. | G01M 3/3218 73/49.2 |
| 4,364,261 A * | 12/1982 | Askwith | .................. | G01M 3/26 73/40 |
| 5,105,654 A | 4/1992 | Maruyama et al. | | |
| 5,113,705 A * | 5/1992 | Earnhardt | ........... | G01M 3/2876 73/1.25 |
| 5,287,729 A | 2/1994 | Lehmann | | |
| 6,330,823 B1 | 12/2001 | Raymond | | |
| 6,952,963 B2 * | 10/2005 | Delnevo | .................. | G01F 23/14 73/149 |
| 9,279,737 B2 | 3/2016 | Pavlik | | |
| 2001/0001921 A1 | 5/2001 | Sperry et al. | | |
| 2008/0066525 A1 | 3/2008 | Kojima et al. | | |
| 2011/0058986 A1 * | 3/2011 | Yokoi | ................... | A61L 2/0094 422/111 |
| 2014/0165707 A1 | 6/2014 | Dahlberg et al. | | |

FOREIGN PATENT DOCUMENTS

| | | |
|---|---|---|
| DE | 10 2012 101 128 A1 | 8/2012 |
| EP | 0 380 863 A1 | 8/1990 |
| JP | H03243843 A | 10/1991 |
| JP | 2007-108102 A | 4/2007 |

OTHER PUBLICATIONS

Japanese Patent Office, Notice of Reasons for Rejection in counterpart Japanese Application No. 2017-198529, dated Oct. 23, 2018.
European Patent Office, Extended Search Report in counterpart European Application No. 17199909.7, dated May 8, 2018.
Pall Life Sciences, "Palltronic® Flowstar IV: Filter Integrity Test Instrument and MUX Extension," 13 pages, (2014).
Pall Life Sciences, "Palltronic® Flowstar LGR Test Instrument," 6 pages, (2015).
Pall Life Sciences, "Technical Report: Pall® Leak Testing of Single-Use Systems with Palltronic® Flowstar LGR Test Instrument," 9 pages, (2016).

* cited by examiner

*Primary Examiner* — Justin Seo
*Assistant Examiner* — John M Royston
(74) *Attorney, Agent, or Firm* — Leydig Voit & Mayer (57) ABSTRACT

Methods and systems for leak testing flexible expandable bags are disclosed.

10 Claims, 9 Drawing Sheets

METHOD AND SYSTEM FOR LEAK TESTING

BACKGROUND OF THE INVENTION

A variety of fluids, including solutions and suspensions in the pharmaceutical and biopharmaceutical industries, are typically processed and/or prepared (including mixing) in systems including one or more flexible containers, such as flexible bags (sometimes referred to as "biocontainers," or "bioreactors"), connected by flexible polymeric tubing. For some applications, it is preferred to dispose of the system after use, rather than cleaning and re-using various system components. Such disposable systems are typically referred to as "single-use systems," (SUSs). If a system is compromised (e.g., due to damage in transit and/or due to handling) and/or there is a risk that liquid contents of the system could leak on personnel coming in contact with the system, the system and contents may have to be discarded. Accordingly, it is desirable to test the system and/or flexible container(s) for leaks before use.

Conventional methods for detecting leaks include, the pressure decay test, immersion test, sniffing, and trace gas detection. While these methods can be effective in certain circumstances, there is a need for improved methods and systems for leak testing.

The present invention provides for ameliorating at least some of the disadvantages of the prior art. These and other advantages of the present invention will be apparent from the description as set forth below.

BRIEF SUMMARY OF THE INVENTION

An embodiment of the invention provides a method of leak testing a flexible expandable bag having at least one port and at least one flexible wall, the method comprising: (a) filling the flexible bag with gas flowing through the at least one port such that the flexible bag expands, wherein filling the flexible bag includes measuring a flow rate of the gas into the flexible bag while maintaining a constant pressure of the gas in the flexible bag; (b) measuring displacement of the flexible wall; and, (c) determining whether a leak is present.

In a preferred embodiment of the method, determining whether a leak is present comprises using the formula:

$$\int_0^t Q \cdot dt = K \cdot d + L \cdot t$$

wherein
Q is the measured flowrate into the bag at time t
K is a constant relating dimensional change to the increase in volume of the bag
d is the dimensional change at time t.
L is the flow from a leak, if present, wherein, if there is no leak, L=0.

In another embodiment, a system for leak testing a flexible expandable bag having at least one port and at least one flexible wall is provided, comprising (a) a gas flow meter; (b) a gas pressure regulator; (c) a gas pressure transducer; (d) a gas pressure relief valve; (e) a displacement measurement sensor, arranged to measure displacement of the flexible wall of the bag as the bag expands while being filled with gas; (f) at least three valves, each valve being controllable to allow or prevent gas flow therethrough; (g) a plurality of conduits, arranged to provide a first fluid flow path from a pressurized gas supply to the flexible expandable bag, the first fluid flow path bypassing the gas flow meter and/or the gas pressure regulator, and a second fluid flow path from the pressurized gas supply to the flexible expandable bag, the second fluid flow path passing through the gas flow meter and the gas pressure regulator, the first fluid flow path and the second fluid flow path each passing through at least one of the three valves, wherein the second fluid flow path communicates with the gas pressure transducer and the gas pressure relief valve, and wherein at least one conduit in the plurality of conduits has an end suitable for communicating with the at least one port of the flexible expandable bag; and; (h) an apparatus including a computer control unit, the apparatus controlling operation of the valves and gas flow through the first fluid flow path and the second fluid flow path, the apparatus communicating with, and receiving data from, the gas flow meter, the gas pressure regulator, the gas pressure transducer, and the displacement measurement sensor, regarding gas flow rate, gas pressure, and displacement of the flexible wall of the bag, to determine whether a leak is present.

In a preferred embodiment of the system, the computer control unit is programmed to carry out linear regression and determine whether a leak is present using the formula:

$$\int_0^t Q \cdot dt = K \cdot d + L \cdot t$$

wherein
Q is the measured flow rate into the bag at time t
K is a constant relating dimensional change to the increase in volume of the bag
d is the dimensional change at time t.
L is the flow from the leak, if present; wherein no leak is present when L=0.

BRIEF DESCRIPTION OF THE SEVERAL VIEWS OF THE DRAWING(S)

FIGS. 3A and 3B illustrate exemplary set ups using systems according to embodiments of the invention for use with a substantially rectangular flexible bag (preferably a flexible bag in a single-use bag system) that can be placed in a tote, also showing a displacement measurement sensor (wherein the systems, e.g., as diagrammed in FIG. 2, are essentially contained in apparatus 50, with the exception of conduits communicating with the flexible bag).

DETAILED DESCRIPTION OF THE INVENTION

In accordance with an embodiment of the present invention, a method of leak testing a flexible expandable bag having at least one port and at least one flexible wall comprises (a) filling the flexible bag with gas flowing through the at least one port such that the flexible bag expands, wherein filling the flexible bag includes measuring a flow rate of the gas into the flexible bag while maintaining a constant pressure of the gas in the flexible bag; (b) measuring displacement of the flexible wall; and, (c) determining whether a leak is present.

In some embodiments, the method includes initially passing gas into the flexible bag via a fluid flow path bypassing a gas flow meter and/or a gas pressure regulator, before passing gas into the flexible bag using another fluid flow path through the gas flow meter and the gas pressure regulator.

Embodiments of the method include maintaining a constant pressure of gas of at least about 5 mbar, typically, at least about 10 mbar, in some embodiments, maintaining a constant pressure of gas in the range of from about 10 mbar to about 50 mbar.

If desired, an embodiment of the method includes venting the flexible bag after determining whether a leak is present.

In a typical embodiment, the method comprises a sterile method, including passing gas from a pressurized gas source through at least one sterilizing grade filter before passing the gas into the flexible bag.

In a preferred embodiment of the method, determining whether a leak is present comprises using the formula:

$$\int_0^t Q \cdot dt = K \cdot d + L \cdot t$$

wherein
Q is the measured flowrate into the bag at time t
K is a constant relating dimensional change to the increase in volume of the bag
d is the dimensional change at time t.
L is the flow from a leak, if present, wherein, if there is no leak, L=0.

In another embodiment, a system for leak testing a flexible expandable bag having at least one port and at least one flexible wall is provided, comprising (a) a gas flow meter; (b) a gas pressure regulator; (c) a gas pressure transducer; (d) a gas pressure relief valve; (e) a displacement measurement sensor, arranged to measure displacement of the flexible wall of the bag as the bag expands while being filled with gas; (f) at least three valves, each valve being controllable to allow or prevent gas flow therethrough; (g) a plurality of conduits, arranged to provide a first fluid flow path from a pressurized gas supply to the flexible expandable bag, the first fluid flow path bypassing the gas flow meter and/or the gas pressure regulator, and a second fluid flow path from the pressurized gas supply to the flexible expandable bag, the second fluid flow path passing through the gas flow meter and the gas pressure regulator, the first fluid flow path and the second fluid flow path each passing through at least one of the three valves, wherein the second fluid flow path communicates with the gas pressure transducer and the gas pressure relief valve, and wherein at least one conduit in the plurality of conduits has an end suitable for communicating with the at least one port of the flexible expandable bag; and; (h) an apparatus including a computer control unit, the apparatus controlling operation of the valves and gas flow through the first fluid flow path and the second fluid flow path, the apparatus communicating with, and receiving data from, the gas flow meter, the gas pressure regulator, the gas pressure transducer, and the displacement measurement sensor, regarding gas flow rate, gas pressure, and displacement of the flexible wall of the bag, to determine whether a leak is present.

In some embodiments, the system for leak testing has at least four valves, each valve being controllable to allow or prevent gas flow therethrough.

In an optional embodiment of the system for leak testing, the apparatus communicates with, and receives data from, the pressure relief valve.

In an embodiment, the system for leak testing further comprises (i) at least one first sterilizing grade filter in fluid communication with the pressurized gas supply and the first fluid flow path and the second fluid flow path, for maintaining sterility of a single-use system during testing, and may further comprise (j) at least one second sterilizing grade filter in fluid communication with the first fluid flow path and the second fluid flow path, for maintaining sterility of the single-use system during venting, after determining whether a leak is present. If desired, embodiments of the system can include at least two first sterilizing grade filters, e.g., a one first sterilizing grade filter interposed between the pressurized gas supply and the inlet of the system, and another first sterilizing grade filter communicating with an inlet port of the flexible bag, interposed between the outlet of the system and the inlet port of the flexible bag, wherein one filter maintains sterility of a single-use system during testing, and another filter protects leak testing system elements (e.g., the gas flow meter and the gas pressure regulator) from undesirable material such contaminants) during testing.

In a preferred embodiment of the system for leak testing, the computer control unit is programmed to carry out linear regression and determine whether a leak is present using the formula:

$$\int_0^t Q \cdot dt = K \cdot d + L \cdot t$$

wherein
Q is the measured flow rate into the bag at time t
K is a constant relating dimensional change to the increase in volume of the bag
d is the dimensional change at time t.
L is the flow from the leak, if present; wherein no leak is present when L=0.

Advantageously, in contrast with some existing methods and systems that can detect, using a 120 L bag and a test pressure of about 50 mbar, leaks of about 100 mls/min, or greater, methods and systems according to the present invention can detect smaller leaks, e.g., about 50 mls/min, or less, in a 120 L bag at a test pressure of about 50 mbar. Illustratively, methods and systems according to the present invention can detect leaks down to a level of about 20 mls/min in a 120 L bag at a test pressure of about 50 mbar. Alternatively, or additionally, leaks can be detected without requiring a predetermined threshold pass/fail value for each single-use system.

In a typical embodiment of the method, the pressure of gas in the bag is controlled for at least about 5 minutes while measuring the displacement of the flexible bag, to determine whether a leak is present. More typically, the pressure of gas in the bag is controlled in the range of for about 10 minutes to about 30 minutes while measuring the displacement of the flexible bag, to determine whether a leak is present.

The constant pressure of the gas to be maintained in the flexible bag while carrying out the method is less than the burst pressure of the flexible bag, and preferably below the pressure at which the plastic in the flexible wall starts to permanently deform so that the bag can be deflated to the original state if appropriate for use in the production process. Typically, the pressure is at least about 5 mbar, but the pressure can be more, depending on the bag being tested. The pressure used can be determined by one of skill in the art.

If it is desirable to maintain sterility during testing and/or minimize exposing system elements to undesirable material, at least one sterilizing grade (e.g., having a bacterial blocking pore size or pore rating such as an average pore size of about 0.2 micrometers or less) filter is interposed in the fluid flow path between the pressurized gas source and the flexible bag, such that any gas passing into the bag has passed through the filter, e.g., without exposure to the outside environment. It may be desirable to include sterilizing grade filters at each end of the system, e.g., in the fluid flow path between the pressurized gas source and the inlet of the system, and in the fluid flow path between the outlet of the system and an inlet port of the flexible bag. Optionally, a sterilizing grade filter between the outlet of the system and an inlet port of the flexible bag is part of a single-use bag system, rather than part of an embodiment of the leak test system. In those embodiments wherein gas is vented from the bag after testing (e.g., while compressing the bag and/or while filling the bag with a fluid such as a liquid (for example, cell culture fluid)), if it is desirable to maintain sterility of the bag system, the vent line should also include a sterilizing grade filter, such that the vented gas is passed through the filter without allowing the interior of the bag to be exposed to the outside environment.

As used herein, the term "gas" includes air.

According to an embodiment, determining the presence or absence of a leak in the bag comprises using the following formula:

$$\int_0^t Q \cdot dt = K \cdot d + L \cdot t$$

wherein
Q is the measured flowrate into the bag at time t
K is a constant relating dimensional change to the increase in volume of the bag
d is the dimensional change at time t.
L is the flow from a leak, if present, wherein, if there is no leak, L=0.

Linear regression is carried out using data after the time when the flow rate starts to decrease, through to the end of the test.

Derivation of the equation above comes from a mass balance on the test process, so: mass of gas added to flexible bag=(expansion of flexible bag+volume leaked)×gas density. Then at constant pressure, the expression can be divided by the gas density, so: volume of gas added to flexible bag=expansion of flexible bag+volume leaked.

At constant pressure and temperature (a) the volume added to the flexible bag will be the integral of the measured flow with respect to time; (b) the expansion of the flexible bag will be a constant times the measured dimensional change; and, (c) the volume leaked will be the leak flow rate times the time of measurement. So:

$$\int_0^t Q \cdot dt = K \cdot d + L \cdot t$$

Bag systems such as single-use systems can include a plurality of flexible bags, connected by flexible polymeric tubing. The volume of gas contained within the tubing in such systems is small compared to the volume of gas in the bags, and the increase in volume due to expansion of the tubing is proportionally much smaller due to the thicker tubing walls and the materials of construction. Consequently, provided all the bags in a single-use system are made from the same material and have about the same volume, leak testing according to embodiments of the invention are also applicable for the test of that single-use system including a plurality of flexible bags by measuring the expansion of only one of the bags.

A variety of flexible expandable containers (bags) can be tested in accordance with embodiments of the invention. Such flexible expandable bags, which are typically produced from one or more plastic films, can have a variety of formats, such as 2D and 3D formats, e.g., 2D flexible bags having 2 opposing sides, forming, for example, a generally "pillow shape" when filled, or, for example, 3D flexible bags having a bottom wall, a top wall, and four side walls of a substantially rectangular configuration, made of a flexible sheet material, comprising a plurality of ports, the bottom, top, and side walls being provided by four separate sheets which are joined together at their edges, wherein a first sheet forms the bottom wall, a second sheet forms the top wall, and a third and fourth sheet form a first and a second side wall at two opposite sides of the container, the four sheets each further comprising, in addition to the portions forming the bottom, top and first and second sides, integrally formed triangular or trapezoid shaped wall portions at opposite ends thereof, the triangular or trapezoid shaped wall portions form, when joined together, a third and fourth side all, respectively.

The flexible expandable bags can be any suitable volume or size, e.g., about 1 or about 2 liters or more, typically at least about 10 L, for example, about 20 L to about 500 L, or in the range of about 100 L to about 5,000 L, such as about 500 L to about 3,500 L. Such flexible bags, e.g., for processing fluids with volumes of more than 1 or 2 liters, are typically referred to as bioreactors or biocontainers. Suitable flexible bags include, but are not limited to, ALLEGRO™ 2D Biocontainers and ALLEGRO™ 3D Biocontainers, commercially available from Pall Corporation (Port Washington, N.Y.).

The bags can be used for a wide variety of applications, such as, for example, cell culture (e.g., including batch and fed-batch operations of suspension and adherent cell lines, to produce, for example, antibodies, proteins, vaccines, and gene therapy products), preparing sterile fluids for the pharmaceutical and/or biopharmaceutical industries, including drugs, vaccines, and intravenous fluids, antibody- and/or protein-containing fluids, and/or fluids for the food and beverage industry.

Each of the components of the invention will now be described in more detail below, wherein like components have like reference numbers.

Figure 1:
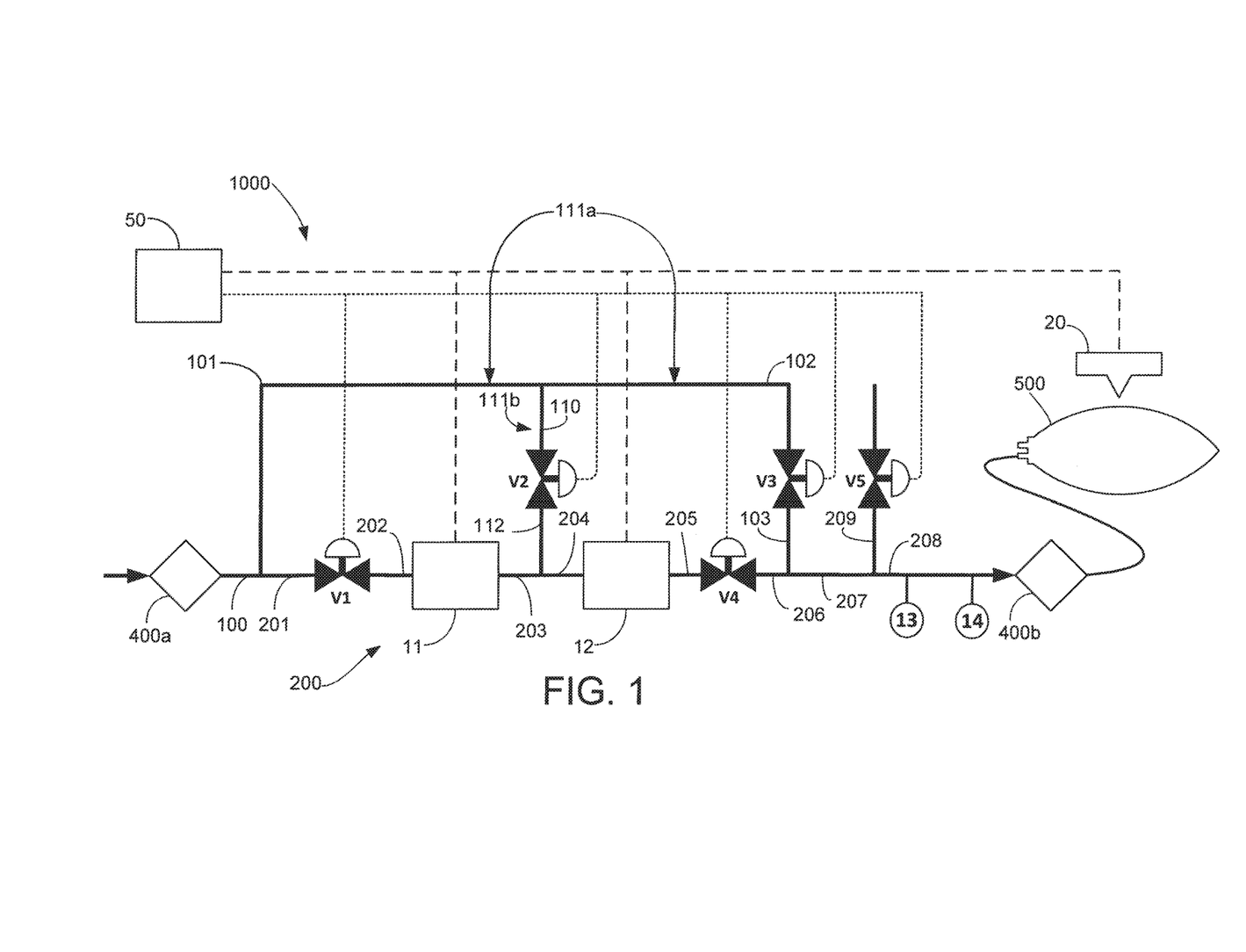
FIG. 1 is a diagrammatic illustration of a system according to an embodiment of the present invention, communicating with a flexible bag.

FIG. 1 illustrates an embodiment according to the invention comprising a system 1000 for leak testing a flexible expandable bag 500, wherein the system comprises a plurality of conduits (providing a plurality of fluid flow paths; one of the conduits has an end suitable for communication with a pressurized gas source, another conduit has an end suitable for communication with a port of the flexible expandable bag), a plurality of gas flow on/off valves (5 valves, valves V1, V2, V3, V4, and V5, are shown), a plurality of connectors, a gas flow meter 11, a gas pressure regulator 12, a pressure transducer 13, a pressure relief valve 14, a displacement sensor 20, and an apparatus 50 including a computer control unit. The apparatus 50 including the computer control unit controls operation of the gas on/off valves and gas flow through the fluid flow paths, and communicates with, and receives data from, the gas flow meter, the gas pressure regulator, the gas pressure transducer, and the displacement measurement sensor, regarding gas flow rate, gas pressure, and displacement of the flexible wall of the bag, to determine whether a leak is present. In this illustrated embodiment, the broken and dotted lines show electrical connections with various components.

One fluid flow path, 200, communicates with the pressurized gas source (and optionally, one or more sterilizing filters; in this illustrated embodiment, sterilizing filters 400*a* and 400*b* are shown) and flexible expandable bag 500 via conduits 100, 201, 202, 203, 204, 205, 206, 207, and 208), and allows gas passage through gas flow meter 11 and gas pressure controller 12, and communicates with pressure relief valve 13 and pressure transducer 14, passing through valves V1 and V4. If desired, sterilizing filter 400*b* can be part of a single-use bag system, rather than a component of system 1000.

The embodiment of the system illustrated in FIG. 1 provides at least one, and if desired, two, fluid flow paths bypassing the gas pressure regulator, wherein one of the fluid flow paths also bypasses the gas flow meter.

A first bypass fluid flow path, 111*a*, bypasses the gas flow meter 11 and the gas pressure controller 12, wherein the bypass fluid flow path 111*a* comprises conduit 101 (connected to conduit 100 via a connector that also connects with conduit 201), conduit 102 (connected to conduit 101 via a connector that also connects with conduit 110) and conduit 103 (connected to conduit 207 via a connector that also connects with conduit 206), and passing through valve V3.

A second bypass fluid flow path, 111*b*, bypasses the gas flow meter 11, wherein bypass fluid flow path 111*b* comprises conduit 101 (connected to conduit 100 via a connector that also connects with conduit 201), conduit 110 (connected to conduit 101 via a connector that also connects with conduit 102), and conduit 112 (connected to conduit 204 via a connector that also connects with conduit 203), and passing through valve V2.

Either or both of the bypass fluid flow paths can be utilized to quickly pass gas into the flexible expandable bag (while ensuring the pressure is less than the pressure at which the plastic in the flexible wall permanently deforms), before passing gas along fluid flow path 200 while measuring the flow rate of the gas into the bag while maintaining a constant pressure of the gas into the bag, measuring displacement of a flexible wall of the bag, and determining whether a leak is present.

The illustrated system also shows a vent flow path, comprising conduit 209, and if desired, an optional sterilizing filter (not shown), allowing gas to be vented from the flexible bag after testing.

Figure 2:
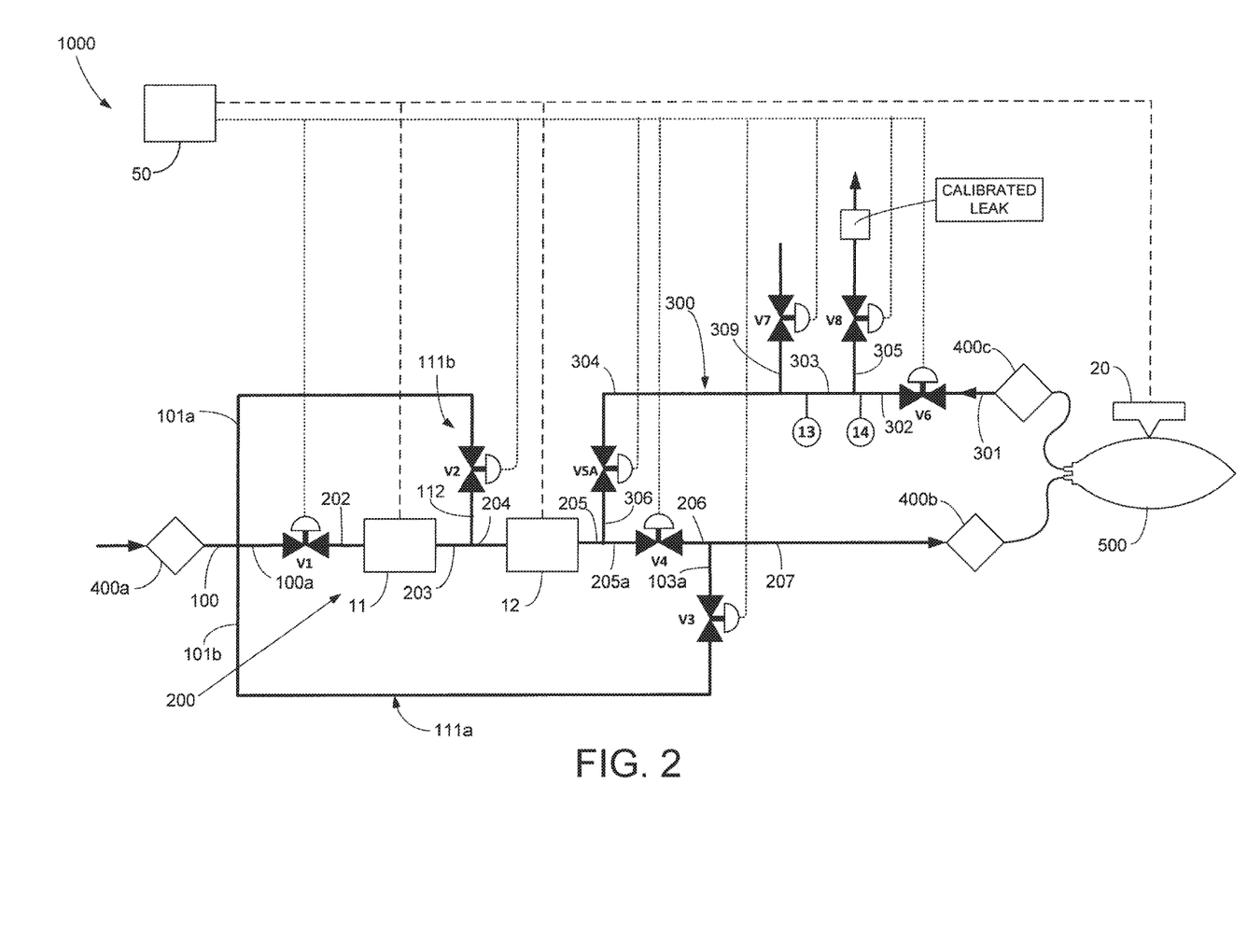
FIG. 2 is a diagrammatic illustration of a system according to another embodiment of the present invention, communicating with a flexible bag.

FIG. 2 illustrates another embodiment according to the invention comprising a system 1000 for leak testing a flexible expandable bag 500, wherein the system comprises a plurality of conduits (providing a plurality of fluid flow paths; one of the conduits has an end suitable for communication with a pressurized gas source, another conduit has an end suitable for communication with a port of the flexible expandable bag), a plurality of gas flow on/off valves (8 valves, valves V1, V2, V3, V4, V5A, V6, V7, and V8 are shown), a plurality of connectors, a gas flow meter 11, a gas pressure regulator 12, a pressure transducer 13, a pressure relief valve 14, a displacement sensor 20, and an apparatus 50 including a computer control unit. The apparatus 50 including the computer control unit controls operation of the gas on/off valves and gas flow through the fluid flow paths, and communicates with, and receives data from, the gas flow meter, the gas pressure regulator, the gas pressure transducer, and the displacement measurement sensor, regarding gas flow rate, gas pressure, and displacement of the flexible wall of the bag, to determine whether a leak is present. In this illustrated embodiment, the broken and dotted lines show electrical connections with various components.

One fluid flow path, 200, communicates with the pressurized gas source (and optionally, sterilizing filters 400*a* and 400*b*) and flexible expandable bag 500 via conduits 100, 100*a*, 202, 203, 204, 205, 205*a*, 206, and 207), and allows gas passage through gas flow meter 11 and gas pressure controller 12, passing through valves V1 and V4.

The embodiment of the system illustrated in FIG. 2 provides at least one, and if desired, two, fluid flow paths bypassing the gas pressure regulator, wherein one of the fluid flow paths also bypasses the gas flow meter.

A first bypass fluid flow path, 111*a*, bypasses the gas flow meter 11 and the gas pressure controller 12, wherein the bypass fluid flow path 111*a* comprises conduit 101*b* (connected to conduit 101*a* via a connector that also connects with conduits 100 and 100*a*), and conduit 103*a* (connected to conduit 207 via a connector that also connects with conduit 206), and passing through valve V3.

A second bypass fluid flow path, 111*b*, bypasses the gas flow meter 11, wherein bypass fluid flow path 111*b* comprises conduit 101*a* (connected to conduits 101*b* via a connector that also connects with conduits 100 and 100*a*), and conduit 112 (connected to conduit 204 via a connector that also connects with conduit 203), and passing through valve V2.

Either or both of the bypass fluid flow paths can be utilized to quickly pass gas into the flexible expandable bag, before passing gas along fluid flow path 200 while controlling the flow rate of the gas into the bag while maintaining a constant pressure of the gas into the bag, measuring displacement of a flexible wall of the bag, and determining whether a leak is present.

The illustrated system also shows a calibrated leak flow path 300, comprising conduit 301 (allowing gas to pass through optional sterilizing filter 400*c*), as well as conduits 302, 303, 304, 305, and 306, including an optional vent flow path, comprising conduit 309, and if desired, an optional sterilizing filter (not shown), allowing gas to be vented from the flexible bag after testing.

Calibrated leak flow path 300 communicates with pressure relief valve 13 and pressure transducer 14.

If desired, sterilizing filter 400*b* and/or sterilizing filter 400*c* can be part of a single-use bag system, rather than a component of system 1000.

Figure 3A:
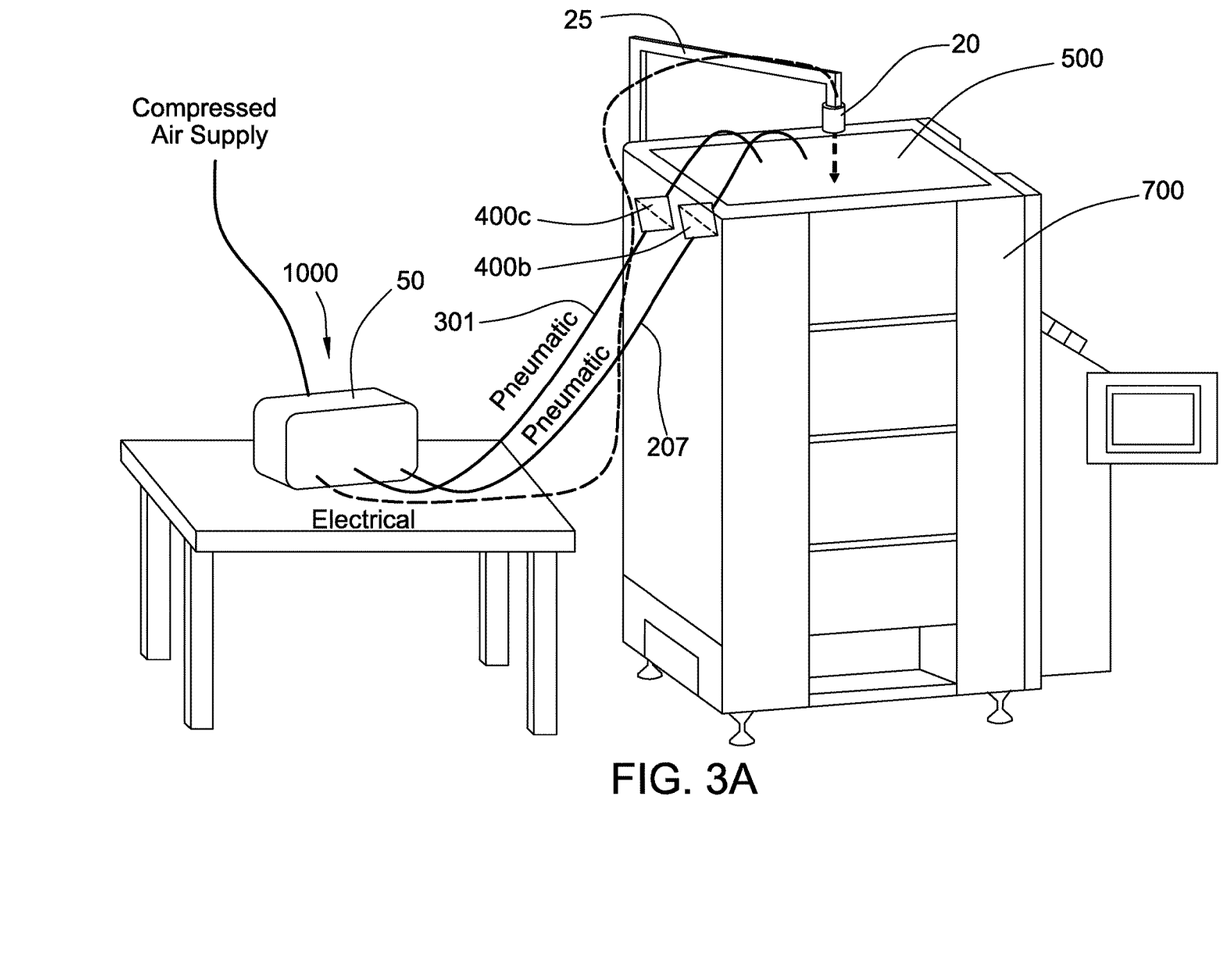
FIG. 3A shows the displacement measurement sensor mounted to the tote.

For some embodiments, e.g., wherein the bag is to be filled with liquid (e.g., cell culture fluid for some bioreactor or biocontainer applications) before further use, the bag is vented by introducing the liquid which vents the bag by displacing the gas. Thus, the bag can be vented using a variety of bioreactor/biocontainer fill systems. For example, using FIGS. 3A and 3B for reference, while the bag is in the tote after testing, liquid can be introduced into the bag, displacing the gas.

Figure 3B:
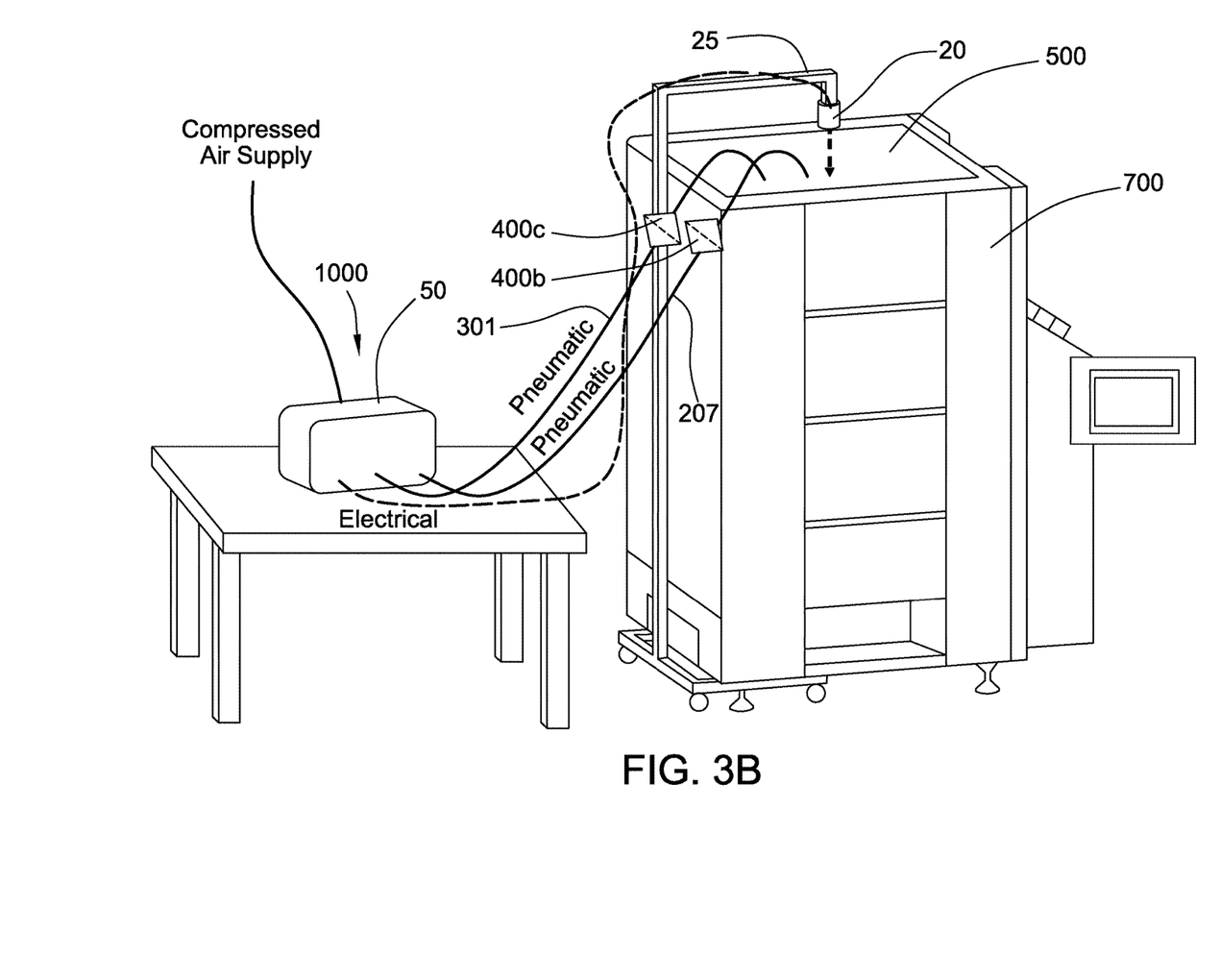
FIG. 3B shows the displacement measurement sensor mounted to a moveable trolley, separate from the tote.
Figure 3C:
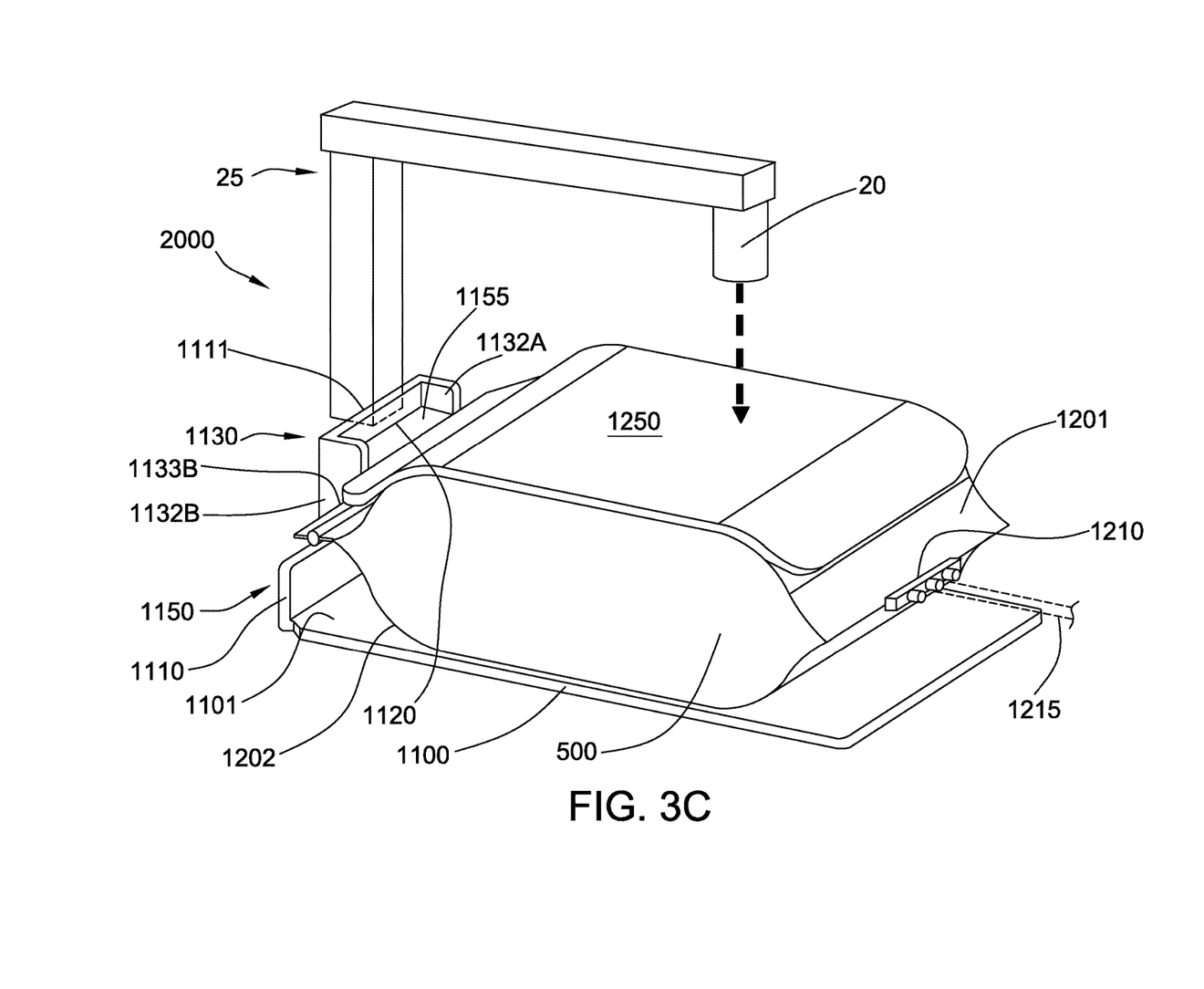
FIG. 3C illustrates a partial perspective view another exemplary set up of a system according to an embodiment of the invention, for use with a substantially "pillow-shaped" (2D) flexible expandable bag (illustrated as gas filled), also showing a displacement measurement sensor, as well as an apparatus for venting the flexible expandable bag by compression in accordance with an embodiment of the invention.

Alternatively, if the bag is to be compressed for venting, a variety of methods and systems can be used to compress the bag during venting. Illustrative methods and systems include, for example, those disclosed in U.S. Patent Publication US2016/0251098 A1. One example of an apparatus 2000 for venting is shown in FIG. 3C, illustrating a flexible polymeric sheet 1250, a bag receiving device 1150 comprising a base 1100 comprising a surface 1101, and at least one raised wall 1110, the raised wall having a portion 1111 for allowing the sheet, and a flexible bag 500, to be secured to the bag receiving device. The illustrated bag receiving device also includes retainer 1130, wherein a portion 1111 of raised side wall 1110 includes slot or cut out 1133B, arranged in arm 1132B (the other arm 1132A also includes a slot or cut out (not shown)) attached to the side wall. Some commercially available bags include an element such as a rod or shaft that is engageable with the slots, allowing the bag to be secured to the bag receiving device (e.g., as shown in FIG. 4). Alternatively, the retainer can further comprise a rod that is engageable with the slots to secure the bag 500 to the bag receiving device. In this illustration of a bag receiving device 1150, a portion 1111 of raised side wall 1110 includes a slot or cut out 1120 for receiving an extension or "tongue" end 1155 of the flexible polymeric sheet 1250. Alternatively, or additionally, the sheet can be secured to the base or side wall by a fastener such as a screw, nail, pin, rivet, bolt, clip, or clamp.

The bag 500 illustrated in FIG. 3C, which has an interior volume, also includes a port 1210 and a conduit 1215 in fluid communication with the interior volume, wherein the illustrated bag is a 2D or pillow bag, having opposing flexible side walls 1201 and 1202 sealed at the edges and defining the interior volume therein.

A variety of flexible polymeric sheets are suitable for use during venting in embodiments of the invention. The sheet should be flexible in order to generally conform to the shape of the bag (or at least conforming to the shape of the flexible wall of the bag contacting the sheet. The sheet can be made from any suitable flexible material, typically a polymeric and/or elastomeric material, such as, for example, silicone, polyvinyl chloride (PVC), neoprene, nitrile rubber, VITON, and a terpolymer of ethylene, propylene and a diene, such as, for example, ethylene propylene diene terpolymer (EPDM). One example of a suitable material is a general purpose silicone sheet available from Silex Silcones Ltd. (UK), as "silicone solid sheet."

The flexible polymeric sheet can have any density as long it is sufficient to compress and evacuate the gas-filled flexible bag when placed on a wall of the bag and the gas fluid flow path from the interior of the bag is opened. For example, as explained in more detail below, in some embodiments, the sheet has a thickness in the range of from about 4 mm to about 20 mm, and a density in the range of from about 3 $Kg/m^2$ to about 15 $Kg/m^2$.

Using a silicone sheet as an example, the sheet has a specific gravity in the range of from about 1.1 to about 1.5 $g/cm^3$. Density is calculated by specific gravity $(g/cm^3) \times$ thickness (mm)=$Kg/m^2$. Assuming a bag receiving device for a 5 L bag has dimensions of 0.56 m×0.42 m, the area=0.235 $m^2$. Using a silicone sheet thickness of 8 mm, and a specific gravity of 1.2 $g/cm^3$; density=1.2 $g/cm^3 \times 8$ mm=9.6 $Kg/m^2$. For an evacuation system for a 5 L bag, 0.235 $m^2 \times 9.6$ $Kg/m^2$=2.25 Kg. Assuming a bag receiving device for a 10 L bag has dimensions of 0.66 m×0.47 m, the area=0.31 $m^2$. Using a silicone sheet thickness of 8 mm, and a specific gravity of 1.2 $g/cm^3$; density=1.2 $g/cm^3 \times 8$ mm=9.6 $Kg/m^2$. For an evacuation system for a 10 L bag, 0.31 $m^2 \times 9.6$ $Kg/m^2$=2.97 Kg. Assuming a bag receiving device for a 50 L bag has dimensions of 0.9 m×0.75 m, the area=0.675 $m^2$. Using a silicone sheet thickness of 12 mm, and a specific gravity of 1.25 $g/cm^3$; density=1.25 $g/cm^3 \times 12$ mm=15 $Kg/m^2$. For an evacuation system for a 50 L bag, 0.675 $m^2 \times 15$ $Kg/m^2$=10.13 Kg.

In some embodiments, e.g., wherein a bag is about 20 L or greater, in order to complete bag evacuation in less time, a sheet having a greater thickness is used as compared to the thickness used when the bag has a lesser volume, e.g., about 5 to about 10 L.

The sheet can have suitable size, shape, and/or configuration. For example, as shown in FIG. 3C, the sheet can have essentially the same dimensions of the base of the bag receiving device, or can have portions cut away. Typically, the sheet should have a sufficient dimension to cover at least about 75% of the area, preferably at least about 90% of the area, of the flexible wall of the bag to be compressed. Preferably, the sheet should not cover the port of the bag from which gas is to be evacuated.

In order to vent gas from the bag using the embodiment of the apparatus shown in FIG. 3C, the flexible polymeric sheet 1250 is placed in contact with the upper wall of the gas filled flexible container 500, and the flow path passing through conduit 1215 leading to the port 1210 is opened (e.g., by opening a closed clamp on the conduit), and the bag is compressed, venting gas through the conduit.

A variety of gas flow meters, gas pressure regulators, gas pressure transducers, displacement measurement sensors, gas flow valves (including gas pressure relief valves), conduits, and apparatuses including computer control units (the apparatuses can have several components in a single housing, or can comprise one or more components in separate housings), and software programs, are suitable for use in the invention.

Illustratively, suitable gas flow meters include, for example, thermal mass flow meters and coriolis mass flow meters; suitable gas pressure regulators include, for example, digital electronic pressure controllers, such as forward pressure controllers; suitable displacement measurement sensors include, for example, laser triangulation sensors (which do not require contact with the wall of the bag), linear variable differential transformers (LVDT; require contact with the wall of the bag), and capacitive displacement sensors (which do not require contact with the wall of the bag, but may require a metal surface, such as a lever arrangement); suitable software programs for analyzing data include, for example, Mathworks MATLAB.

One example of a suitable apparatus including a computer control unit that can be adapted for use in accordance with embodiments of the invention is the PALLTRONIC® Flowstar LGR Test Instrument (Pall Corporation, Port Washington, N.Y.).

The displacement measurement sensor can be used in accordance with embodiments of the invention in a variety of arrangements and configurations. For example, in order to measure the displacement of one flexible surface of the biocontainer, the displacement sensor could be mounted over the biocontainer, measuring the displacement of the top surface, as illustratively shown in FIGS. 3A-3C, also showing a fixture 25 and the sensor 20. Among other arrangements, the sensor 20 could be supported on a fixture 25 that is mounted to a biocontainer tote 700 itself (FIG. 3A), or the sensor could be mounted to a fixture 25 that is free standing on the floor next to the biocontainer tote 700 (FIG. 3B). With respect to FIG. 3C, also showing a bag receiving device 1150, the sensor can be supported on a fixture mounted to the bag receiving device, or the sensor could be mounted to a fixture that is free standing next to the bag receiving device.

The mounting of the sensor should be rigid to minimize vibration or other movement which could disrupt the displacement measurement. If desired, the fixture can have height adjustment in order to properly locate the displacement sensor in height over the biocontainer prior to the test to allow for biocontainer installation variance. Depending on the measurement range of the displacement sensor and the expected change in displacement of the biocontainer during the measurement, an actuator can be used to adjust the height of the displacement sensor during the test (under control of the computer control unit).

The following examples further illustrate the invention but, of course, should not be construed as in any way limiting its scope.

Example 1

This example demonstrates leak testing in accordance with embodiments of the invention.

The system, which is arranged as generally shown in FIGS. 1 and 3C (for 2D bags) includes the following: Solenoid gas flow valves (¼ inch), including a pressure relief valve (a normally open solenoid valve linked to a pressure switch (SMC; ISE10-M5-B; wired so that the electrical signal to the normally open valve is cut if the pressure rises above the pressure switch operating pressure) connected with flexible nylon tubing and compression fittings; a thermal mass flow meter (Bronkhorst Low-ΔP-Flow; F-101-AGD-22-V, range 50-2,500 sccm), a gas pressure controller (Bronkhorst EL Press; P-602CV-350R-AGD-22-V, regulatable from 5-100 mbarg), a gas pressure sensor (Vegabar; BAR14.X1SA1GV1, range from 0-100 mbarg), a laser triangulation displacement sensor (Micro-Epsilon; ILD2300-50LL, at 50 mm range, resolution 0.8 μm, linearity 10 μm); a computer system (Hardware: National Instruments CompactDAQ; Software: National Instruments Labview), data moved to laptop computer for processing using a Mathworks MATLAB software program.

The pressure relief valve is set to operate at a pressure of 60 mbar, which is above the test pressure of 50 mbar, but below the pressure at which the biocontainer would burst.

The use of at least one fluid flow path bypassing the gas flow meter to pass gas into the flexible bag allows the flexible bag to be filled more quickly. If desired, the initial bypassing flow may exceed the maximum measurement range of the gas flow meter.

2D SOL bags are tested using a test pressure of 50 mbar. An opaque patch is placed on the upper surface of the bag such that the patch is aligned with the laser triangulation displacement sensor for displacement measurement.

A compressed gas supply, regulated to about 1 barg, is connected to the inlet of the system via one sterilizing filter and the outlet of the system is connected via another sterilizing filter to a convenient port on the biocontainer under test via flexible tubing.

All other ports on the biocontainer are closed by a pinch clamp on flexible tubing.

The following filling sequence is used to fill the biocontainer to reduce the time to fill: Valve V3 is opened (V1, V2, V4, and V5 are closed) to allow gas to flow through the fill line via bypass fluid path 111a to rapidly fill the biocontainer to the test pressure. When the pressure in the biocontainer approaches the test pressure, valve V3 is closed, and valves V2 and V4 are opened to route flow through bypass fluid path 111b around the gas flow meter and through the gas pressure controller. As the pressure in the biocontainer gets close to the test pressure, valve V1 is opened to allow flow through the gas flow meter, and then valve V2 is closed, such that gas flows along fluid flow path 200. The set point for the gas pressure controller is provided from the computer system. The pressure set point is compensated for the pressure drop along the flexible tubing at the measured gas flow rate, to give the 50 mbar test pressure in the biocontainer.

Test measurements are started when the test pressure is reached.

The gas flow rate through the gas flow meter and the change in dimension of the biocontainer are measured at regular intervals from the start of the test, over a period of 10-30 minutes.

In order to establish if a detectable leak is present in the biocontainer, the gas flow rate is numerically integrated with respect to time from the start of the test to each point in time, to give the volume of gas added to the biocontainer at time t.

The following formula is used:

$$\int_0^t Q \cdot dt = K \cdot d + L \cdot t$$

wherein

Q is the measured flowrate into the bag at time t

K is a constant relating dimensional change to the increase in volume of the bag d is the dimensional change at time t.

L is the flow from a leak, if present, wherein, if there is no leak, L=0.

The leakage flow is calculated using the formula provided above. Since there is an initial increase from zero in flow rate when the gas is passed through the gas flow meter, the linear regression is carried out from the time when the flow rate starts to decrease from a maximum value through to the end of the test.

Graphing the integrated volume/time versus the displacement/time shows a linear relationship passing through zero since no leak is detected.

At the end of the test, the biocontainer is vented by opening valve V5, and closing valves V1, V2 and V3, followed by V4.

After the biocontainer has been vented, the flexible tubing is disconnected from the test system and, if no leak is detected, the biocontainer can be put into the production process.

Example 2

This example demonstrates that the gas volume added is proportional to the displacement (expansion in one dimension) of the flexible expandable bag in the absence of a leak.

The 2D bag has a volume of 120 L. The system and method of testing is as generally described in Example 1. An opaque patch is placed on the upper surface of the bag such that the patch is aligned with the laser triangulation displacement sensor for displacement measurement.

Once the biocontainer has been inflated and reached test pressure, the flow required to maintain this pressure while the biocontainer expands is measured along with the displacement of one flexible wall. During this period, the integral of the flow into the biocontainer (i.e. the volume added) is proportional to the biocontainer expansion in one dimension, as measured by the displacement sensor.

Figure 4:
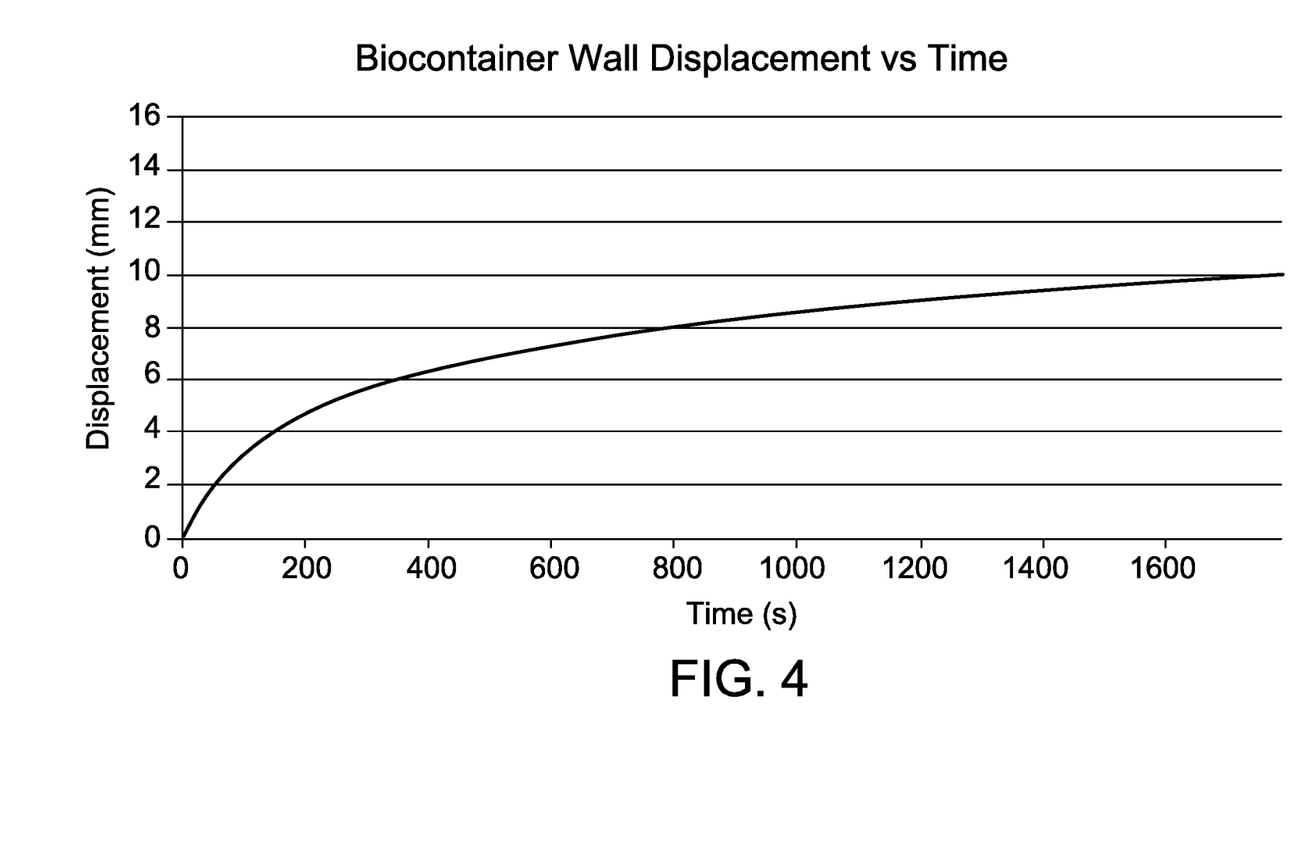
FIG. 4 is a graph showing expansion in one direction (displacement of a wall) of a flexible expandable bag as a function of time during a leak test.
Figure 5:
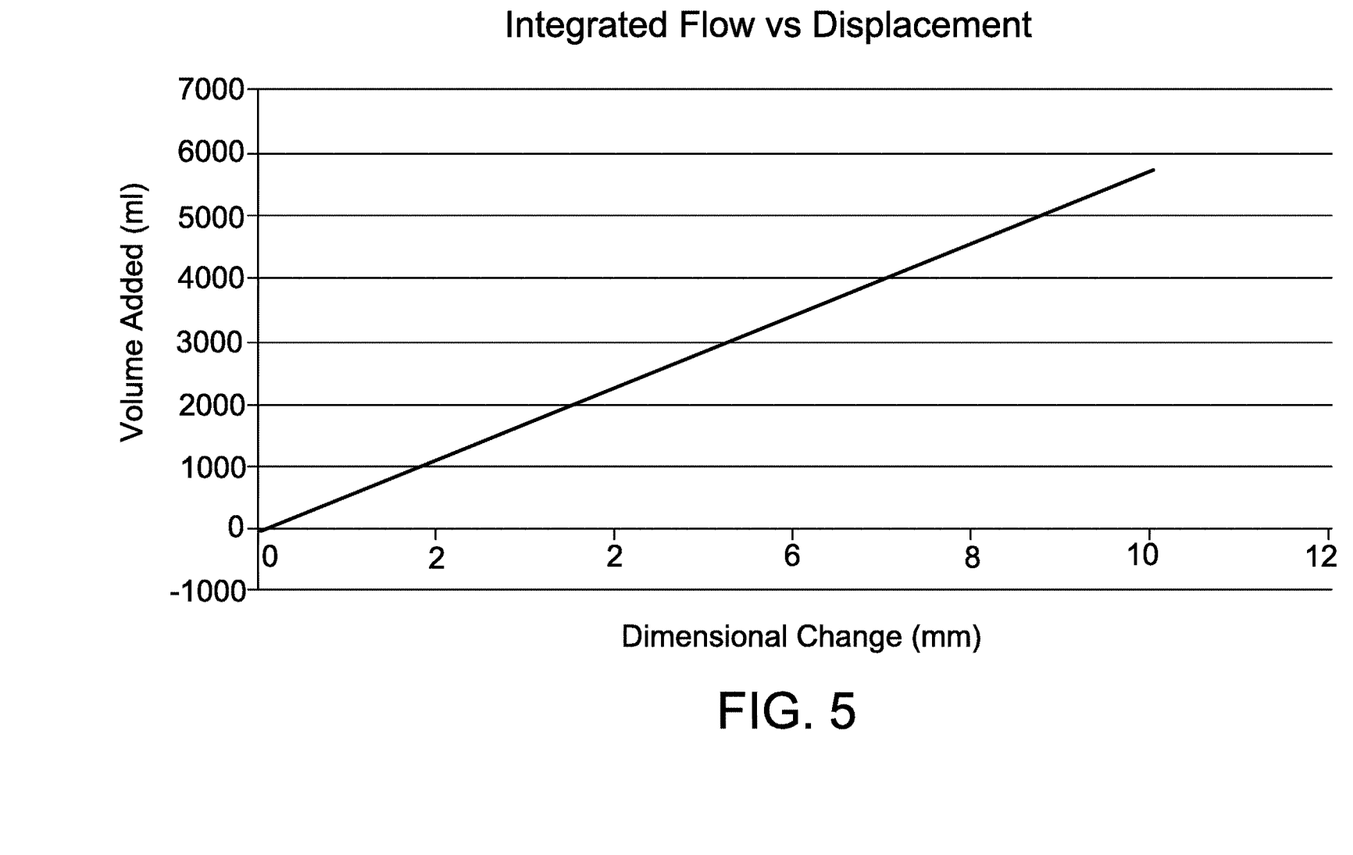
FIG. 5 is a graph showing gas volume added (integration of gas flow rate with respect to time) as a function of the displacement of the wall of the bag for the test referenced in FIG. 4. This graph demonstrates that the gas volume added is proportional to the displacement (expansion in one dimension) of the bag in the absence of a leak.

As shown in FIG. 4, the dimensional change of the bag (the measurement of the distance that the flexible bag wall moves when expanding in a direction perpendicular or close to perpendicular to the wall) changes as a function of time during a leak test. As shown FIG. 5, gas volume added (integration of flow rate with respect to time) is proportional to the displacement (expansion in one dimension) of the bag in the absence of a leak.

Example 3

This example demonstrates leak testing in accordance with another embodiment of the invention, both when a leak is not present, and when a calibrated leak is present, using 2D bags.

The system, which is arranged as generally shown in FIGS. 2 and 3C, generally includes the components as described in Example 1.

Valve V5A is installed on a branch upstream of valve V4 and the second connection is installed after valve V5A and valve V6 is used to isolate the second connection from the biocontainer. A vent is included as a branch in the second line, via valve V7, and a further branch in the line is connected to a calibrated leak for test purposes, via valve V8.

2D 120 L bags are tested using a test pressure of 50 mbar.

The filling sequence is carried out by opening valves V3 and V6 (V1, V2, V4, V5A, V7, and V8 are closed) to allow gas to flow along first bypass fluid flow path 111a to rapidly fill the biocontainer to a test pressure of 50 mbar. Valve V6 is opened, to allow the pressure in the biocontainer to be verified using the gas pressure transducer. When the pressure in the biocontainer approaches this test pressure, valve V3 is closed, and valves V2 and V4 are opened to route flow through second bypass fluid flow path 111b around the gas flow meter and through the gas pressure controller. As the pressure in the biocontainer gets close to the test pressure, valve V1 is opened to allow flow through the gas flow meter along fluid flow path 200, and then valve V2 is closed. The set point of 50 mbar for the gas pressure controller is provided from the computer system.

Test measurements are started when the test pressure is reached and stable.

The gas flow rate through the gas flow meter and the change in dimension of the biocontainer are measured at regular intervals from the start of the test, over a period of 10-30 minutes.

In order to demonstrate the capability of the system, a calibrated leak is installed downstream of valve V8, and, utilizing flow path 300, including conduits 301, 302, and 305, valve V8 is opened after valve V1 is opened and V2 is closed.

At the end of the test the biocontainer is vented by opening valve V7, and closing valves V1, V2 and V3, followed by V4, and venting through conduit 309.

The flow through the calibrated leak is measured independently by opening valves V1, V5A, V8, with valves V2, V3, V4, V6 and V7 remaining closed.

The leakage flow is calculated using the formula provided above. Since there is an initial increase from zero in flow rate when the gas is passed through the gas flow meter, the linear regression is carried out from the time when the flow rate starts to decrease from a maximum value through to the end of the test.

Figure 6:
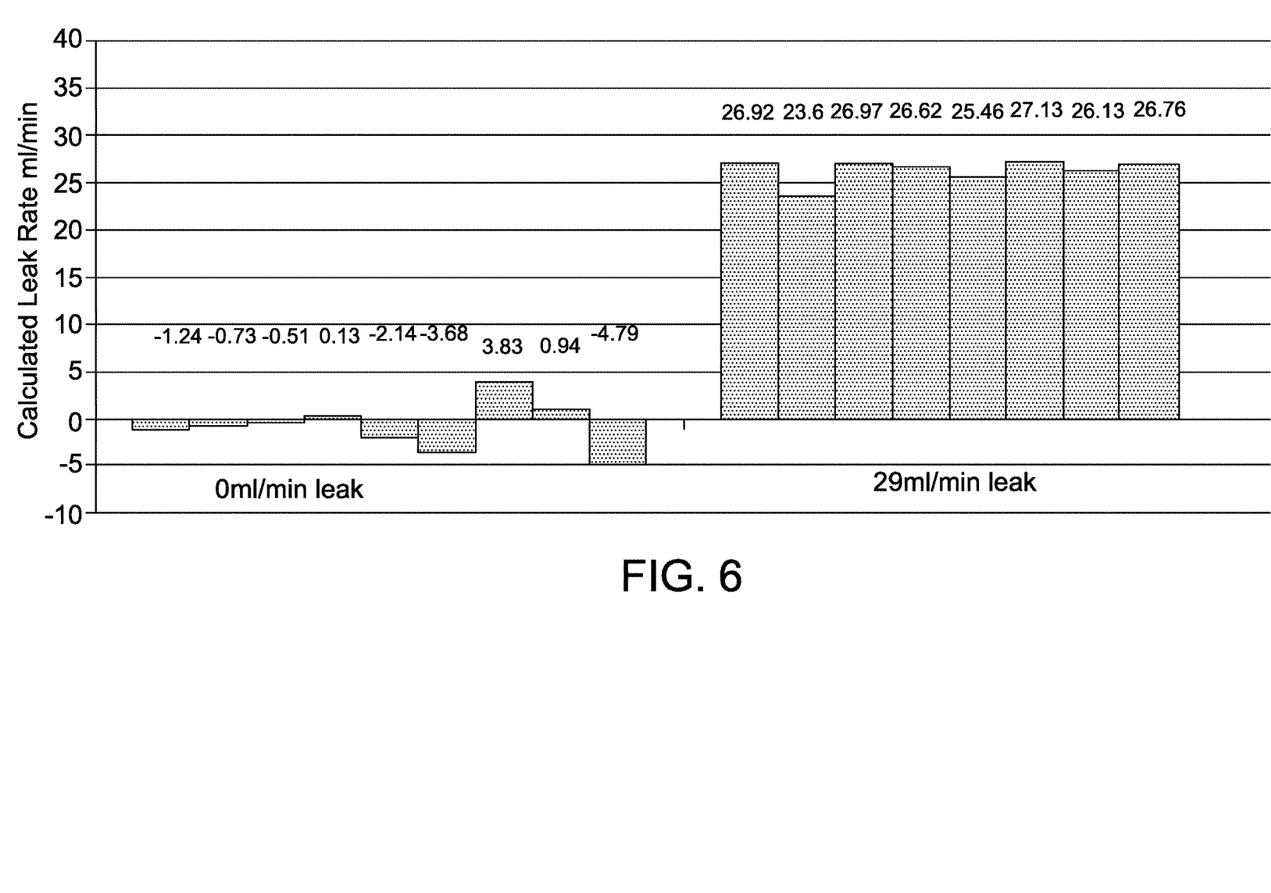
FIG. 6 shows the results of testing 2D bags for leaks when a leak is not present, and when a calibrated leak is present.

FIG. 6 shows the measured values when no leak is present, and when a calibrated leak giving a flow rate of 29 sccm (ml/min) is present, at a differential pressure of 50 mbar.

Example 4

This example demonstrates leak testing in accordance with another embodiment of the invention, both when a leak is not present, and when a calibrated leak is present, using 3D bags in a tote.

The system, which is arranged as generally shown in FIGS. 2 and 3B, generally includes the components as described in Example 1.

Valve V5A is installed on a branch upstream of valve V4 and the second connection is installed after valve V5A and valve V6 is used to isolate the second connection from the biocontainer. A vent is included as a branch in the second line, via valve V7, and a further branch in the line is connected to a calibrated leak for test purposes, via valve V8.

3D 1000 L bags are tested (in a tote) using a test pressure of 25 mbar. An opaque patch is placed on the upper (top) surface of the bag such that the patch is aligned with the laser triangulation displacement sensor for displacement measurement.

The filling sequence is carried out by opening valves V3 and V6 (V1, V2, V4, V5A, V7, and V8 are closed) to allow gas to flow along first bypass fluid flow path 111a to rapidly fill the biocontainer to a test pressure of 25 mbar. Valve V6 is opened, to allow the pressure in the biocontainer to be verified using the gas pressure transducer. When the pressure in the biocontainer approaches this test pressure, valve V3 is closed, and valves V2 and V4 are opened to route flow through second bypass fluid flow path 111b around the gas flow meter and through the gas pressure controller. As the pressure in the biocontainer gets close to the test pressure, valve V1 is opened to allow flow through the gas flow meter along fluid flow path 200, and then valve V2 is closed. The set point of 25 mbar for the gas pressure controller is provided from the computer system.

Test measurements are started when the test pressure is reached and stable.

The gas flow rate through the gas flow meter and the change in dimension of the biocontainer are measured at regular intervals from the start of the test, over a period of 10-30 minutes.

In order to demonstrate the capability of the system, a calibrated leak is installed downstream of valve V8, and, utilizing flow path 300, including conduits 301, 302, and 305, valve V8 is opened after valve V1 is opened and V2 is closed.

At the end of the test the biocontainer is vented by opening valve V7, and closing valves V1, V2 and V3, followed by V4, and venting through conduit 309.

The flow through the calibrated leak is measured independently by opening valves V1, V5A, V8, with valves V2, V3, V4, V6 and V7 remaining closed.

The leakage flow is calculated using the formula provided above. Since there is an initial increase from zero in flow rate when the gas is passed through the gas flow meter, the linear regression is carried out from the time when the flow rate starts to decrease from a maximum value through to the end of the test.

Figure 7:
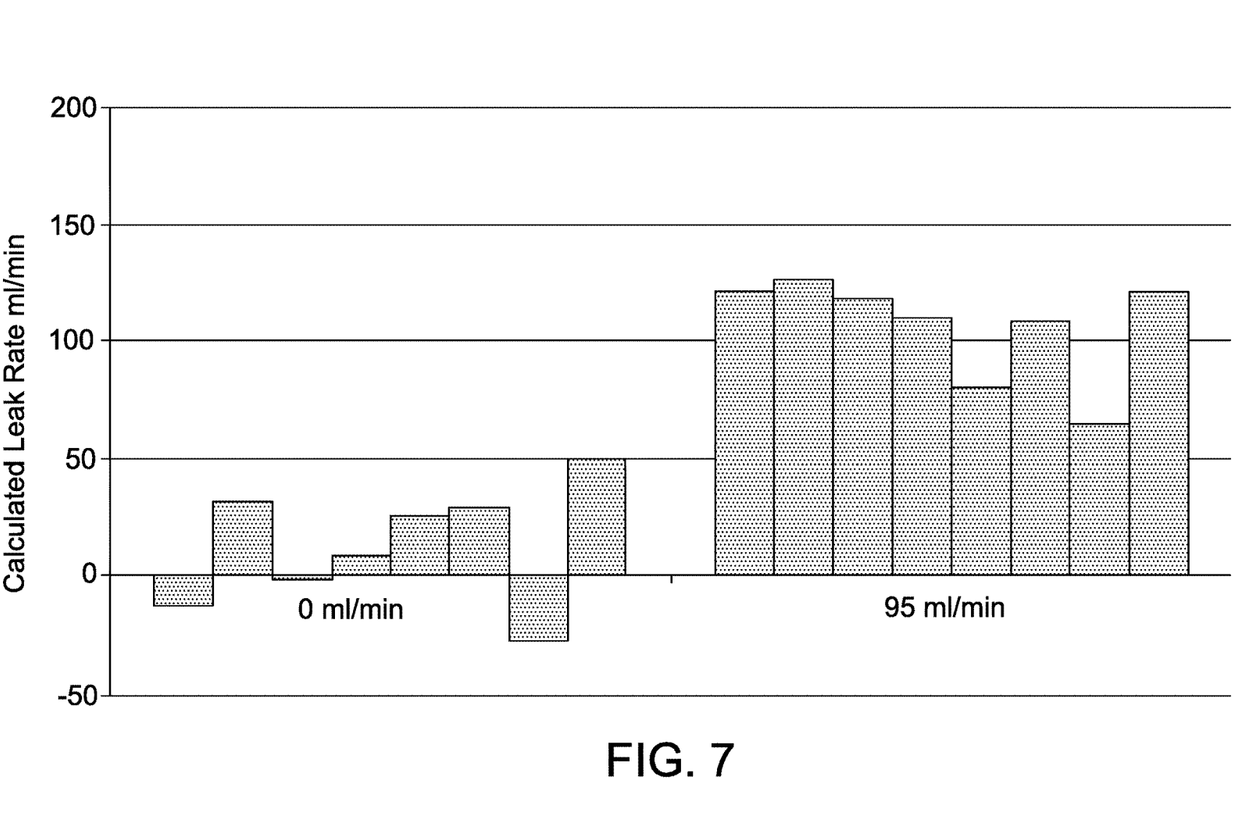
FIG. 7 shows the results of testing 3D bags for leaks when a leak is not present, and when a calibrated leak is present.

FIG. 7 shows the measured values when no leak is present, and when a calibrated leak giving a flow rate of 95 sccm (ml/min) is present, at a differential pressure of 25 mbar.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of leak testing a flexible expandable bag having at least one port and at least one flexible wall in a system comprising:
   a gas flow meter;
   a gas pressure regulator;
   a gas pressure transducer;
   a gas pressure relief valve;
   a displacement measurement sensor, arranged to measure displacement of the flexible wall of the bag as the bag expands while being filled with gas;
   at least three valves, each valve being controllable to allow or prevent gas flow therethrough;
   a plurality of conduits, arranged to provide a first fluid flow path from a pressurized gas supply to the flexible expandable bag, the first fluid flow path bypassing the gas flow meter and/or the gas pressure regulator, and a second fluid flow path from the pressurized gas supply to the flexible expandable bag, the second fluid flow path passing through the gas flow meter and the gas pressure regulator, the first fluid flow path and the second fluid flow path each passing through at least one of the three valves, wherein the second fluid flow path communicates with the gas pressure transducer and the gas pressure relief valve, and wherein at least one conduit in the plurality of conduits has an end suitable for communicating with the at least one port of the flexible expandable bag; and; an apparatus including a computer control unit programmed to carry out linear regression and determine whether a leak is present using the formula:

$$\int_0^t Q \cdot dt = K \cdot d + L \cdot t$$

wherein
Q is the measured flow rate into the bag at time t
K is a constant relating dimensional change to the increase in volume of the bag
d is the dimensional change at time t
L is the flow from the leak, if present; wherein no leak is present when L=0, the apparatus controlling operation of the valves and gas flow through the first fluid flow path and the second fluid flow path, the apparatus communicating with, and receiving data from, the gas flow meter, the gas pressure regulator, the gas pressure transducer, and the displacement measurement sensor, regarding gas flow rate, gas pressure, and displacement of the flexible wall of the bag, to determine whether a leak is present, the method comprising:
   (a) filling the flexible bag with gas flowing through the at least one port such that the flexible bag expands, wherein filling the flexible bag includes measuring a flow rate of the gas into the flexible bag while maintaining a constant pressure of the gas in the flexible bag;
   (b) measuring displacement of the flexible wall; and,
   (c) determining whether a leak is present using the formula:

$$\int_0^t Q \cdot dt = K \cdot d + L \cdot t$$

wherein
Q is the measured flow rate into the bag at time t
K is a constant relating dimensional change to the increase in volume of the bag
d is the dimensional change at time t
L is the flow from the leak, if present; wherein no leak is present when L=0.

2. The method of claim 1, including initially passing gas into the flexible bag via a first fluid flow path bypassing a gas flow meter and/or a gas pressure regulator, before passing gas into the flexible bag using a second fluid flow path through the gas flow meter and the gas pressure regulator.

3. The method of claim 1, including maintaining a constant pressure of gas of at least about 10 mbar.

4. The method of claim 1, including maintaining a constant pressure of gas in the range of from about 10 mbar to about 50 mbar.

5. The method of claim 1, including venting the flexible bag after determining whether a leak is present.

6. The method of claim 1, comprising a sterile method, the method including passing gas from a pressurized gas source through at least one sterilizing grade filter before passing the gas into the flexible bag.

7. A system for leak testing a flexible expandable bag having at least one port and at least one flexible wall, comprising:
   (a) a gas flow meter;
   (b) a gas pressure regulator;
   (c) a gas pressure transducer;
   (d) a gas pressure relief valve;
   (e) a displacement measurement sensor, arranged to measure displacement of the flexible wall of the bag as the bag expands while being filled with gas;
   (f) at least three valves, each valve being controllable to allow or prevent gas flow therethrough;
   (g) a plurality of conduits, arranged to provide a first fluid flow path from a pressurized gas supply to the flexible expandable bag, the first fluid flow path bypassing the gas flow meter and/or the gas pressure regulator, and a second fluid flow path from the pressurized gas supply to the flexible expandable bag, the second fluid flow path passing through the gas flow meter and the gas pressure regulator, the first fluid flow path and the second fluid flow path each passing through at least one of the three valves, wherein the second fluid flow path communicates with the gas pressure transducer and the gas pressure relief valve, and wherein at least one conduit in the plurality of conduits has an end suitable for communicating with the at least one port of the flexible expandable bag; and;

(h) an apparatus including a computer control unit programmed to carry out linear regression and determine whether a leak is present using the formula:

$$\int_0^t Q \cdot dt = K \cdot d + L \cdot t$$

wherein

Q is the measured flow rate into the bag at time t

K is a constant relating dimensional change to the increase in volume of the bag d is the dimensional change at time t L is the flow from the leak, if present; wherein no leak is present when L=0, the apparatus controlling operation of the valves and gas flow through the first fluid flow path and the second fluid flow path, the apparatus communicating with, and receiving data from, the gas flow meter, the gas pressure regulator, the gas pressure transducer, and the displacement measurement sensor, regarding gas flow rate, gas pressure, and displacement of the flexible wall of the bag, to determine whether a leak is present.

8. The system of claim 7, further comprising (i) at least one first sterilizing grade filter in fluid communication with the pressurized gas supply and the first fluid flow path and the second fluid flow path.

9. The method of claim 2, including maintaining a constant pressure of gas of at least about 10 mbar.

10. The method of claim 2, including maintaining a constant pressure of gas in the range of from about 10 mbar to about 50 mbar.

* * * * *